(12) United States Patent
Demmon et al.

(10) Patent No.: US 7,815,220 B2
(45) Date of Patent: Oct. 19, 2010

(54) TILTING AND TELESCOPING STEERING COLUMN ASSEMBLY

(75) Inventors: Robert Demmon, Coldwater, MI (US); David Gruza, Phoenix, AZ (US)

(73) Assignee: Douglas Autotech Corporation, Bronson, MI (US)

( * ) Notice: Subject to any disclaimer, the term of this patent is extended or adjusted under 35 U.S.C. 154(b) by 501 days.

(21) Appl. No.: 11/686,174

(22) Filed: Mar. 14, 2007

(65) Prior Publication Data

US 2007/0235998 A1 Oct. 11, 2007

Related U.S. Application Data

(60) Provisional application No. 60/743,597, filed on Mar. 21, 2006.

(51) Int. Cl.
*B62D 1/18* (2006.01)
(52) U.S. Cl. .......................... 280/774; 74/493
(58) Field of Classification Search ................. 280/775, 280/779; 74/491, 493, 495; 384/29, 35
See application file for complete search history.

(56) References Cited

U.S. PATENT DOCUMENTS

| | | | | |
|---|---|---|---|---|
| 5,243,874 A | * | 9/1993 | Wolfe et al. | .................... 74/493 |
| 5,449,199 A | * | 9/1995 | Heinrichs et al. | ............ 280/775 |
| 5,722,300 A | * | 3/1998 | Burkhard et al. | .............. 74/493 |
| 5,737,971 A | * | 4/1998 | Riefe et al. | .................... 74/493 |
| 6,467,367 B2 | * | 10/2002 | Kim et al. | ...................... 74/493 |
| 6,543,807 B2 | * | 4/2003 | Fujiu et al. | ................... 280/775 |
| 7,178,422 B2 | * | 2/2007 | Armstrong et al. | ............ 74/493 |
| 7,350,814 B2 | * | 4/2008 | Hong et al. | .................. 280/775 |
| 7,469,616 B2 | * | 12/2008 | Fujiu et al. | .................... 74/493 |
| 7,503,234 B2 | * | 3/2009 | Armstrong et al. | ............ 74/493 |

* cited by examiner

*Primary Examiner*—Eric Culbreth
(74) *Attorney, Agent, or Firm*—Kane & Co., PLC

(57) ABSTRACT

A steering column assembly for a vehicle comprising an intermediate assembly which is slideably disposed within a lower assembly so that the intermediate assembly may be moved between an extended and a retracted position. Further, the steering column assembly contains an upper assembly which is pivotally coupled to one end of the intermediate assembly so as to permit the upper assembly to move about a pivot point. The upper assembly further contains a locking assembly which is interconnected between the lower assembly, the intermediate assembly and the upper assembly so that the lower, intermediate and upper assemblies may be locked relative to each other in a selected position when the locking assembly is placed and retained in a first position and permitted to move when said locking assembly is placed and retained in a second position.

26 Claims, 16 Drawing Sheets

TILTING AND TELESCOPING STEERING COLUMN ASSEMBLY

CROSS REFERENCE TO RELATED APPLICATION

This application is a continuation of U.S. Provisional Patent Application No. 60/743,597 filed Mar. 21, 2006.

BACKGROUND OF THE INVENTION

1. Field of the Invention

This invention concerns improvements in steering mechanisms, particularly those for vehicles, and more specifically to an improvement in a steering column which is adjustable both in terms of length (telescoping) and angle (tilting).

2. Background of the Invention

Maximizing driver comfort and safety is a primary goal in the design of any steering column. A steering column that has a fixed position is only suitable for limited number of drivers and can be potentially unsafe for other drivers. Tilt-adjustable and telescopic-adjustable steering columns have been developed to meet the needs of a greater segment of the driving population. Providing a simplified, non-electric tilt and telescopic mechanism is a primary object of this invention. Providing a single mechanism for operating both the tilt adjustment and the telescopic adjustment is another object of the invention.

The steering column and steering wheel also often translate vibrations of the automobile and road to the operator's hands and arms. A reduction in vibrations can greatly improve the driver's comfort and reduce fatigue. A further object of this invention is to provide an improved steering column design having a high natural frequency that reduces lash and vibrations.

Many tilt and telescopic steering columns require the operator to hold the lock actuator with one hand which leaves only one free hand to adjust the tilt and telescopic position of the column. A further object of this invention is to provide a lock actuator that can maintain itself in an unlocked position so that the operator can have two free hands to adjust the tilt and telescopic position of the column.

SUMMARY OF THE INVENTION

A steering column assembly for a vehicle is provided having a high natural frequency. The steering column assembly includes a tilt housing assembly including a fixed assembly and a tilting assembly, and a floating locking mechanism for controlling a position of the tilting assembly relative to the fixed assembly. The steering column assembly also includes a telescoping housing assembly receiving a portion of the tilt housing assembly therein such that the tilt housing assembly is adapted to translate relative to the telescoping housing assembly.

In another form of the invention, a steering column assembly for a vehicle is provided having a high natural frequency of vibration for improved driver comfort. The steering column assembly includes a telescoping housing assembly having a longitudinal passage extending there through and adapted to be fixed at a predetermined location within a panel assembly of the vehicle. A tilting housing assembly is interconnected to the telescoping housing assembly and includes a fixed assembly and a tilting assembly. The fixed assembly includes a portion that is telescopically received within the longitudinal passage and slides relative to the telescoping housing assembly between a first and a second position. The tilting housing assembly includes a floating locking-assembly for fixing a predetermined position of the tiling assembly relative to the fixed assembly.

According to another form of the invention, a steering column assembly is provided including a lower housing assembly having a longitudinal passage extending there through, and an upper housing assembly having a longitudinal member extending there from and adapted to be received in sliding engagement within the longitudinal passage. The upper housing assembly further includes a fixed member attached to an end of the longitudinal member, and a tilting member pivotally coupled to the fixed member where a floating locking mechanism is provided and attached to one of the tilting member or the fixed member for adjusting the relative position of the tilting member to the fixed member.

According to another form of the invention, a steering column assembly having a high natural frequency is provided including an elongated mounting element having a longitudinally disposed central bore with one or more mounting inserts attached therein. A telescopic assembly including one or more tube members is disposed about the longitudinal axis of the mounting element. A lower portion of the tube members abuts the mounting inserts and is slidably attached to the mounting element. A tilt assembly is fixedly attached to an upper end of the telescopic assembly. A tilt lock assembly is operably attached to the tilt assembly. A telescopic lock assembly is operably attached to the telescopic assembly. A lock actuator, selectively adjustable between a locked and unlocked position, is attached to both the tilt lock assembly and the telescopic lock assembly. Mounting inserts can be in pin or cylindrical form. Each pin type mounting insert includes an elongated span in a first axis parallel to the longitudinal axis of the mounting element and a first end angled away from the first axis, the first end attached to the mounting element with the span abutting the tube members. Each cylindrical mounting insert includes a cylindrical polymeric element having an outer surface and an inner void. The outer surface abuts the central bore of the mounting element and the inner void supports the tube members. The tube members include an inner tube having a lower end fixedly attached to the mounting element. An outer tube is slidably disposed over an upper end of the inner tube in a concentric arrangement. The tilt assembly includes a tilting member hingedly attached to a fixed member. The tilting member includes two parallel lobes connected by a perpendicular cross-member where the parallel lobes have a plurality of locking protrusions attached thereto. The tilt lock assembly includes at least one locking pawl hingedly attached to the fixed member. The locking pawl is selectively adjustable between a locked and unlocked position and is meshed with the locking protrusions in the locked position. The tube members have a plurality of locking protrusions which can be selectively meshed with a locking pawl of the telescopic lock assembly. The lock actuator includes a base and two parallel cam lobes extending out transversely therefrom. The base includes a gripping end opposing a pivotal attachment point. Each of the cam lobes has a cam edge disposed between a first and second pawl stop. The mounting element includes an elongated housing that has a plurality of flanges disposed thereon.

According to another form of the invention, a steering column assembly having a high natural frequency includes an elongated mounting element having a longitudinally extending center channel. A telescopic assembly including an elongated telescopic member is disposed about a longitudinal axis and a lower portion thereof is slidably disposed within the center channel of the mounting element. A tilt assembly is fixedly attached to an upper end of the telescopic member. A tilt lock assembly is operably attached to the tilt assembly. A telescopic lock assembly is operably attached to the mounting element. An actuating handle, selectively adjustable between a locked and unlocked position, is pivotally attached to the tilt assembly. The handle operably abuts the tilt lock assembly and is attached via a cable to the telescopic lock assembly. One or more positioning rods include an elongated span in a first axis parallel to the longitudinal axis of the mounting element and a first end angled away from the first axis. The first end of the rod is attached to the mounting element while the remaining span abuts the telescopic member. The tilt assembly includes a tilting member hingedly attached to a fixed member. The tilting member includes two parallel lobes, each having a plurality of locking protrusions attached thereto, connected by a perpendicular cross-member. The tilt lock assembly includes at least one locking pawl hingedly attached to the fixed member. The locking pawl is selectively adjustable between a locked and unlocked position and is meshed with the locking protrusions in the locked position. The telescopic member has a plurality of locking protrusions attached thereto. The telescopic lock assembly additionally includes a locking pawl that is selectively meshed with the plurality of locking protrusions through actuation by a cable. The lock actuator includes a handle pivotally mounted to the tilt assembly and an actuating tip, which abuts a locking pawl of the tilt lock assembly. The mounting element includes an elongated housing that has a plurality of flanges disposed thereon.

According to another form of the invention, a steering column assembly having a high natural frequency includes a telescopic assembly having one or more tube members. The tube members include an inner tube, a lower end thereof fixedly attached to a mounting element, and an outer tube. The outer tube is wider in diameter than said inner tube and is slidably disposed over an upper end of the inner tube. A tilt assembly is fixedly attached to an upper end of the telescopic member. A tilt lock assembly is operably attached to the tilt assembly and a telescopic lock assembly is operably attached to the telescopic assembly. A lock actuator is hingedly attached to the tilt assembly. The lock actuator, selectively adjustable between a locked and unlocked position, is operably attached to both the tilt lock assembly and the telescopic lock assembly. The lock actuator has a first and second stop. The tilt lock assembly is fixedly engaged with the first stop when the lock actuator is in the locked position. Similarly, the tilt lock assembly is fixedly engaged with the second stop when the lock actuator is in the unlocked position. One or more mounting inserts are attached within a longitudinally extending central bore of the mounting element and abut an outer surface of the tube members. A plurality of flanges are disposed along an outer housing of the mounting element. The tube members have a plurality of locking protrusions attached thereto. The telescopic lock assembly further includes a locking pawl that is operably attached to the lock actuator via a cable and is selectively meshed with the plurality of locking protrusions. The lock actuator includes a base and two parallel lobes extending out transversely therefrom. The base includes a gripping end that opposes a pivotal attachment point. The first and second stops of the lock actuator include a respective bight spaced apart along a cam edge of each lobe.

BRIEF DESCRIPTION OF THE DRAWING FIGURES

DETAILED DESCRIPTION OF THE VARIOUS EMBODIMENTS

Figure 1:
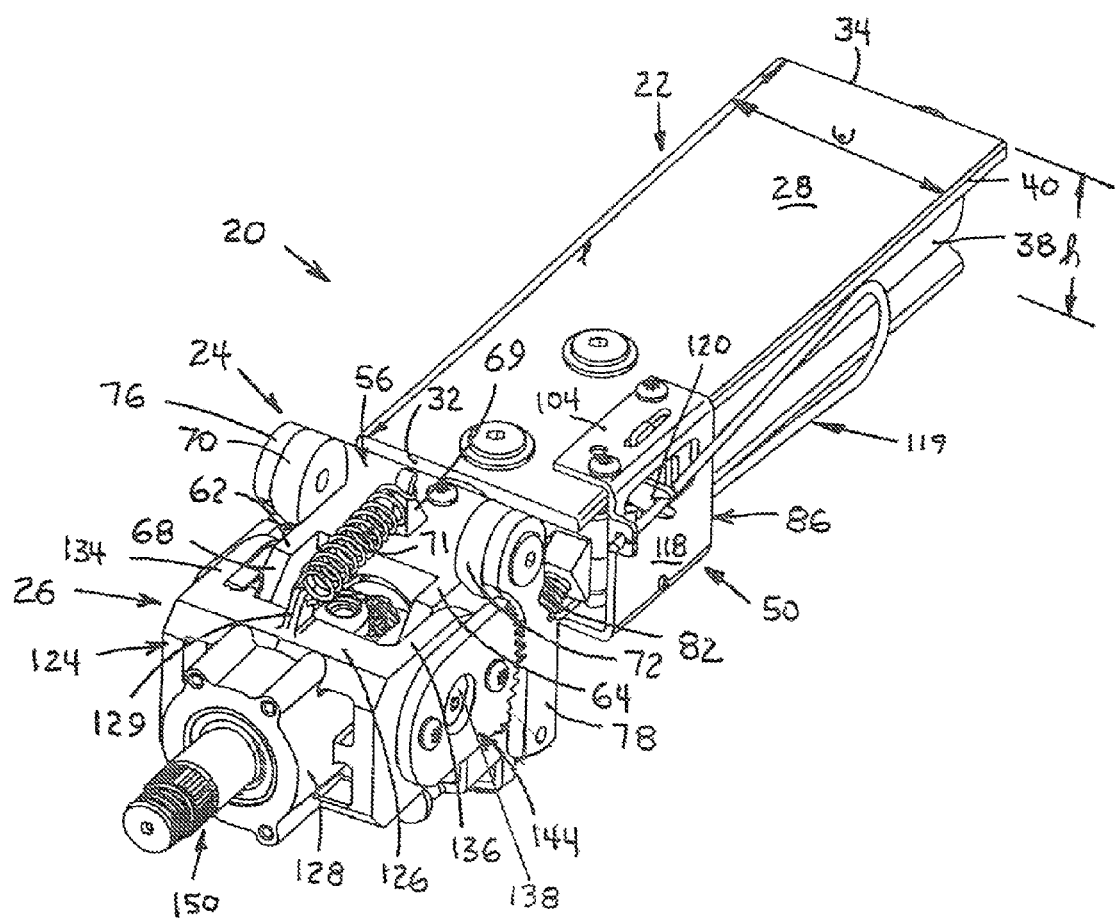
FIG. 1 is an oblique view of one embodiment of a column assembly comprising the invention.
Figure 1A:
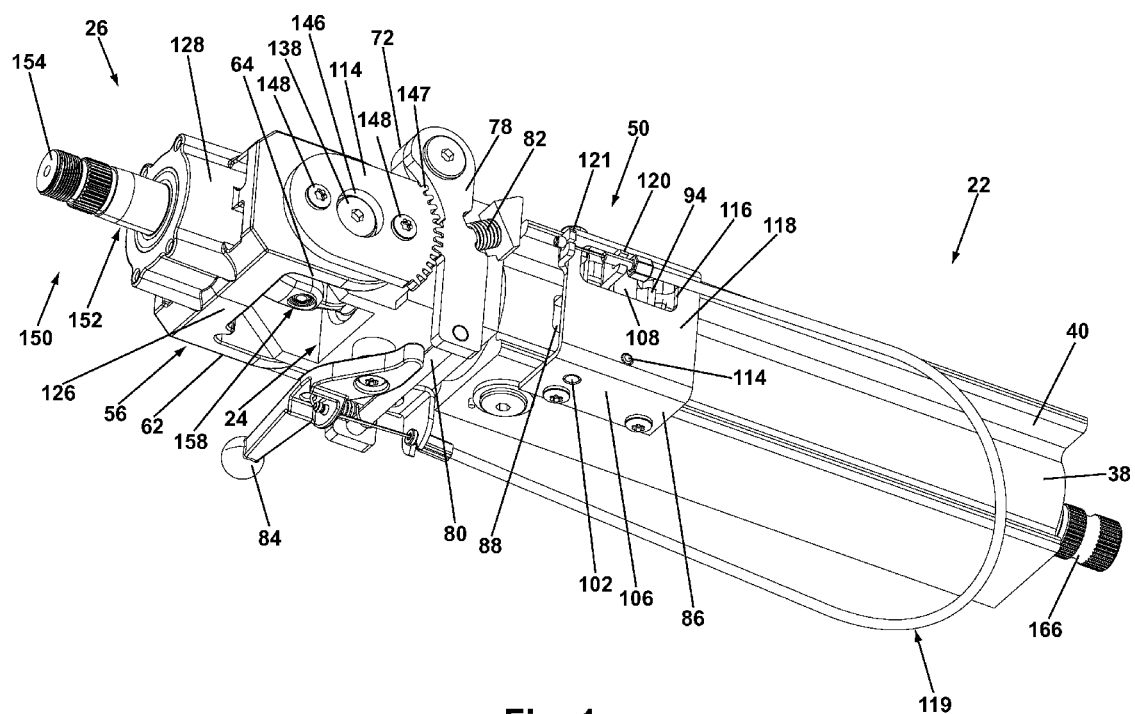
FIG. 1a is a schematic oblique view of one embodiment of a column assembly comprising the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and component spacing, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawing figures, and particularly FIG. 1, the reference numeral 20 is used generally to identify one embodiment of a steering column assembly that may be used in a number of vehicles to control the direction of travel for the vehicle. The steering column assembly 20 described herein is particularly adapted to provide a finite number of adjustable configurations. Modifications to the embodiments described below will also be described that can result in an infinite number of adjustment positions.

The particular embodiment of the steering column assembly 20 shown in the drawing figures includes a lower member assembly generally identified by reference numeral 22, a middle member assembly generally identified by reference numeral 24, and an upper member assembly identified by numeral 26. Each of these components interacts to provide the variety of adjustable positions demanded by the vehicle user. Moreover, the physical relationship and tolerances between the different assemblies also result in the improved performance of the invention.

Figure 2:
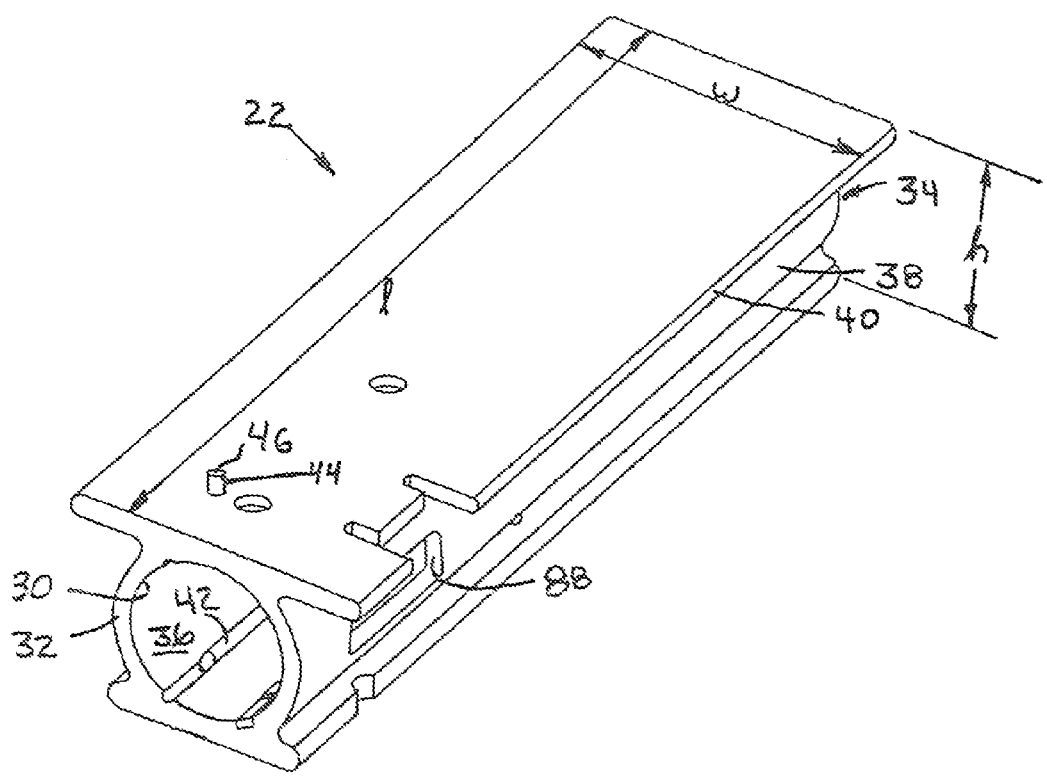
FIG. 2 is an oblique view of a fixed telescope housing assembly.
Figure 3:
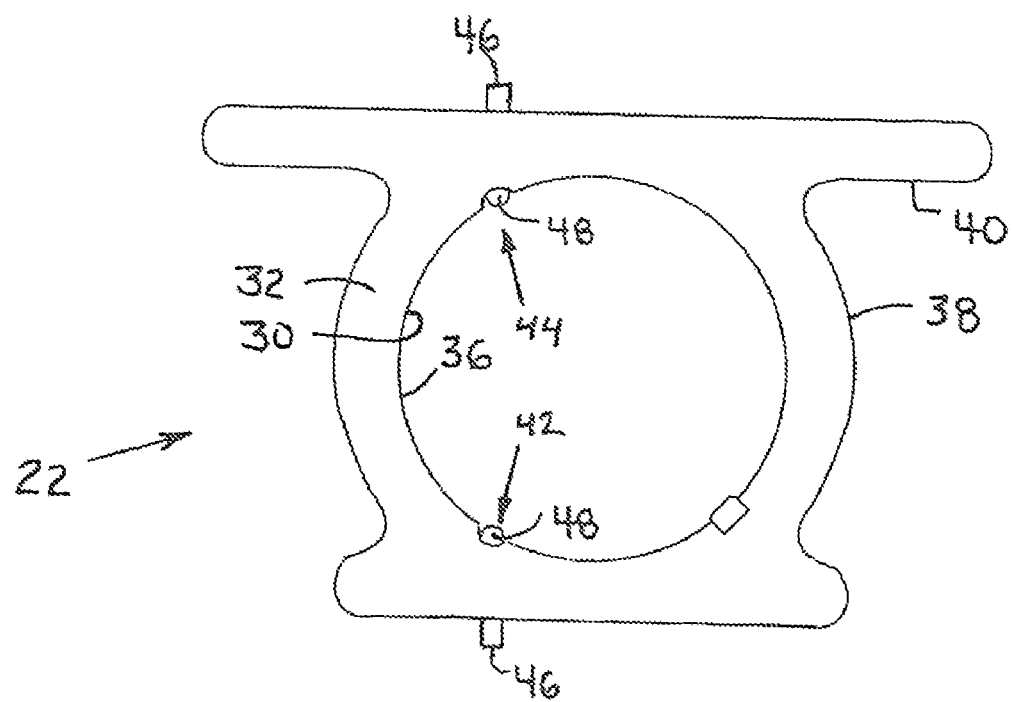
FIG. 3 is an end view of the fixed telescope housing assembly.

In one embodiment of the invention, the lower member assembly 22 includes a lower housing member 28 having a length (l) greater than its width (w) or its height (h) and may have the general or overall form of a rectangular solid. See FIG. 2. The lower housing member 28 preferably includes a longitudinal bore or passage 30 extending entirely there through from a first end 32 to the second and opposite end 34 to define an interior wall 36 and an exterior wall 38. For the purposes of this embodiment and general engineering principles, it is preferred that the longitudinal bore or passage 30 be disposed concentrically along the longitudinal axis l of the lower housing member 28. It is also contemplated that the exterior wall 38 of the lower housing member 38 could be formed to provide various structures to help mount the lower housing member to the vehicle. For example as seen in FIGS. 1 through 3, the exterior wall 38 includes flanges 40 of sufficient thickness through which slots or holes (not shown) may be formed to receive bolts or similar fasteners (not shown) used in mounting the column assembly 20 to the vehicle. Moreover, depending upon the thickness of the material between the interior and exterior wall 36, 38, external structures such as flanges 40 aid in providing structural stiffness to the lower housing member 28. According to one embodiment of the invention, the lower housing member 28 may be manufactured from cast steel, cast aluminum, extruded aluminum or machined metals or strong polymers.

In the embodiment just described and shown in FIG. 3, it is apparent the lower housing member 28 provides the primary structural unit for the steering column assembly 20 from which all other components depend or are interconnected. Accordingly the lower housing member 28 may include additional structure intended to interact with the other components and provide stability. For example, in one form of the invention, the interior wall 36 of the lower housing member may include at least one, preferably two, and most preferably three points of contact where the middle member assembly 24 described in greater detail below comes into contact with the lower member assembly 22 and centers it as well as firmly holds it in position about the longitudinal axis l. According to one form of the invention, and in accordance with the most preferred embodiment, two fixed points of contact are provided along the interior wall 36 by biasing members such as pins 42 and 44. In this form of the invention, pins 42 and 44 may be substantially 'L' shaped, each pin 42 and 44 including a first end 46 extending through a hole or bore (not shown) passing transversely through the interior wall 36, and a second end 48 disposed parallel and laying adjacent the interior wall 36 in a direction substantially parallel to the longitudinal axis l. The body of each pin 42 and 44 that is extending inwardly beyond the boundary of the interior wall 36 provides at least one, and preferably two points of contact with the middle member assembly 24 and described in greater detail below. In the depicted embodiment, a third contact point may be provided by a telescope lock assembly 50, also described below. If a single contact point is used as suggested above, the physical location for that contact point may occur anywhere around the circumference of the interior wall 36. If two contact points are used, the points may be positioned relatively close to one another or no more than 180 degrees apart. By reducing the angle, the contacts can be used to force the middle member assembly in a third direction to remove the lash. In the case of three contact points, it is preferred they be disposed generally equidistant from one another, although not required. If spaced equidistantly apart from each other (approximately 120 degrees) one can maximize the effectiveness of adjusting for lack in tolerance. The one, two or three points of contact with the middle member assembly also remove the need to perform center-less grinding of the tube 28. As will become readily apparent below, it is preferred that one of the points of contact be adjustable or movable to be selectively placed in and out of contact with the middle member assembly to permit adjustment.

In the embodiment described above, the pins 42 and 44 may be coated with a carbon nitride steel such as Melonite®[1] or Armaloy™ or other form of thin dense chrome, or plastic in the form of a cylindrical or square rod. Additionally, rather than rods, the pins 42 and 44 may also be formed from a number of different biasing members such as leaf springs. The pins 42 and 44 reduce the friction between the middle member assembly 24 and the lower housing member 28 by reducing the amount of relative surface area in contact with each other. In a tradeoff between an increase of friction placed on the middle member assembly 24 and a reduction of lash in the entire column, alignment grooves (not shown) may be formed longitudinally along the outer surface of the middle member assembly 24 adapted to engage the pins such as 42 and 44. These grooves would also work with the positioning pins 42 and 44 to prevent rotation of the middle member assembly 24 relative to the lower housing member 28, provide a more secure alignment of the middle member assembly 24 with respect to the lower housing member 28 and thereby further reduce lash.

Figure 4:
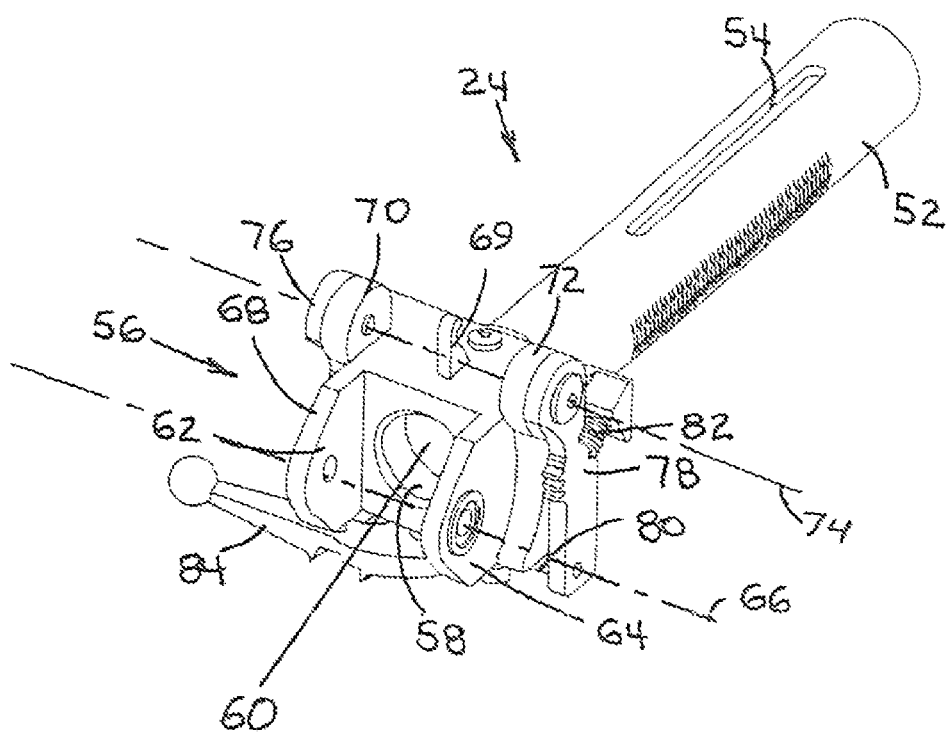
FIG. 4 is an oblique view of a middle assembly.

[1] Melonite is a registered trademark of Burlington Engineering, Inc.;

The middle member assembly 24 is shown in greater detail in FIG. 4. There it can be seen that the middle member assembly 24 may include a right circular-cylinder tubular-member 52 preferably manufactured from steel or similar high strength material and of a dimension to be received within relatively close tolerance within the longitudinal bore 30. The tubular member 52 is of a predetermined length depending in large part upon the amount of translation desired along the longitudinal axis l to provide the telescopic adjustment of the steering column assembly 20. The actual translation distance may be limited or controlled by the length of a travel limiter slot 54 formed along the length of the tube 52 and which is adapted to receive at least one bolt (not shown) passing through the lower housing member 28 and extending at least partially into the slot 54. In the preferred embodiment, two bolts are used to control, and virtually remove, any yaw that may occur as the tube 52 slides between a first retracted position and a second extended position relative to the lower housing member 28. It should be apparent that while this first embodiment shows a cylindrical tube 52 having a substantially circular transverse cross-section, other shapes would be equally effective. A tube having an oval or rectangular transverse cross-section is contemplated to be within the scope of the invention.

Attached to one end of the tubular member 52 may be a second and fixed yoke-member 56. The yoke-member 56 may be made from aluminum, steel, or any rigid material including polymers using conventional casting or machining techniques. Yoke member 56 may include an axial bore 58 in line with the bore 60 of the tubular member 52 and provide the appropriate flanges 62, 64 necessary to permit tilting of the upper member assembly 26 described in greater detail below. In particular, it is contemplated that flanges 62, 64 be disposed diametrically opposite from one another and on opposite sides of the axial bore 58. In a preferred embodiment flanges 62 and 64 lie parallel to one another and in planes normal to the transverse axis 66 about which the upper member assembly 26 will pivot. In addition, the distal ends of each flange 62 and 64 spaced from the yoke 56 may include tapered shoulder 68 to provide a limit to the pivot angle of the upper member assembly 26. At least one post 69 may extend from an upper edge of the fixed yoke member 56 for providing one end of an attachment point for at least one biasing member or tension spring 71. See FIG. 1. The opposite end of the biasing member or spring 71 is attached to a like post on the upper assembly described below.

Adjacent each of the flanges 62 and 64, and preferably disposed slightly outboard of each may be a lobe 70 and 72 adapted to provide a pivot axis 74 for a respective locking pawl 76 and 78. In one form of the invention, the opposite ends of each locking pawl 76 and 78 may include a earn member 80. Alternatively, it is envisioned that a solid bar or other structure discussed in greater detail below may interconnect the lower ends of the pawl members 76 and 78. Springs 82 disposed between each locking pawl 76 and 78 and the fixed yoke 56 urge the locking pawls 76, 78 away from the fixed yoke 56 so that they positively engage the upper member assembly 26 described in greater detail below. A lever 84 pivotally coupled to the bottom of the fixed yoke member 56 positively contacts each cam member 80 extending from each locking pawl 76, 78 to urge each locking pawl to an open position, compressing the springs 82. Release of the lever 84 releases the pressure on the cam members 80 and permits the locking pawls 76, 78 to return to their original position under the bias applied by the springs 82. A cable linkage assembly (not shown) may have one end attached to the lever 84 with the opposite end attached to the telescoping lock assembly 50 for reasons that will become readily apparent and described in greater detail below.

Figure 5:
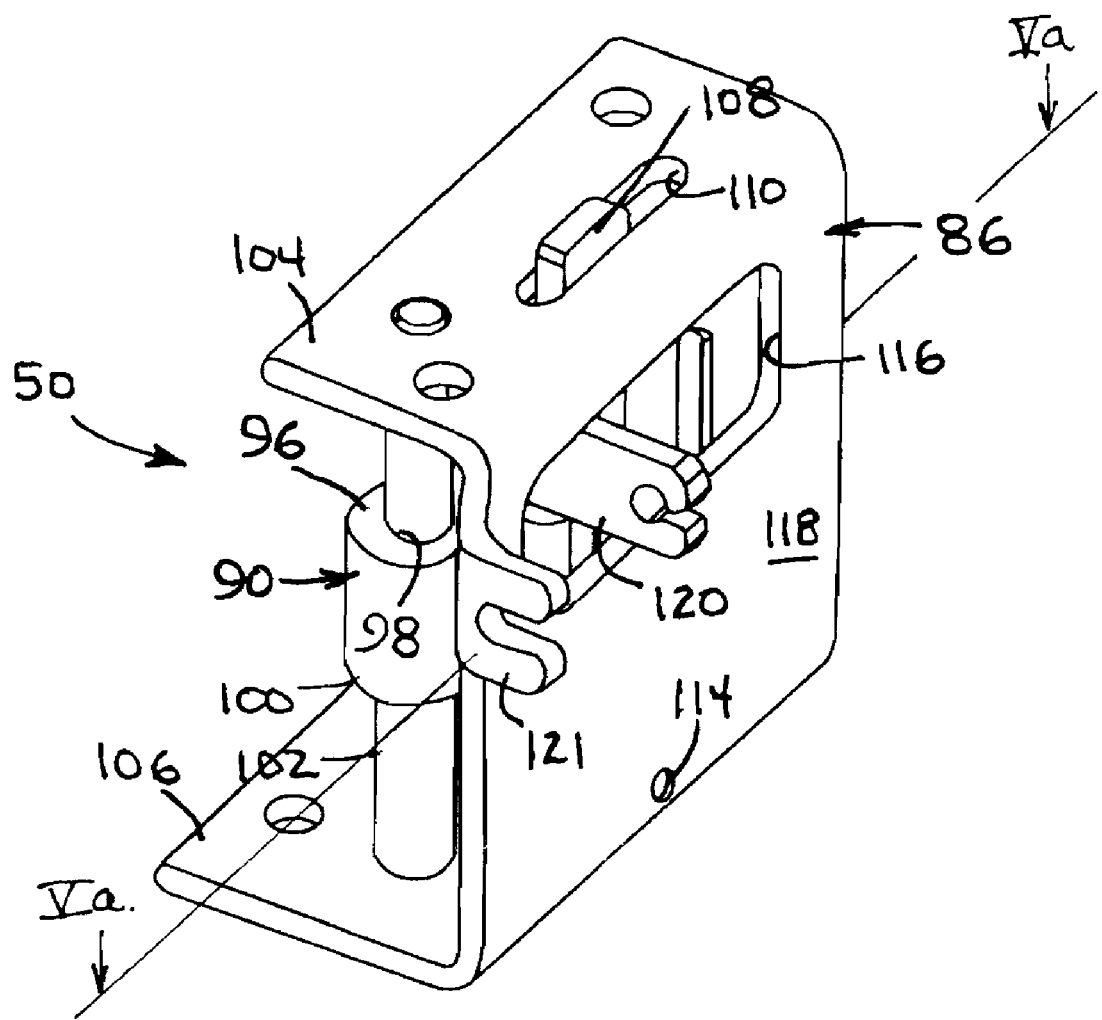
FIG. 5 is an oblique view of a telescope lock assembly.
Figure 5A:
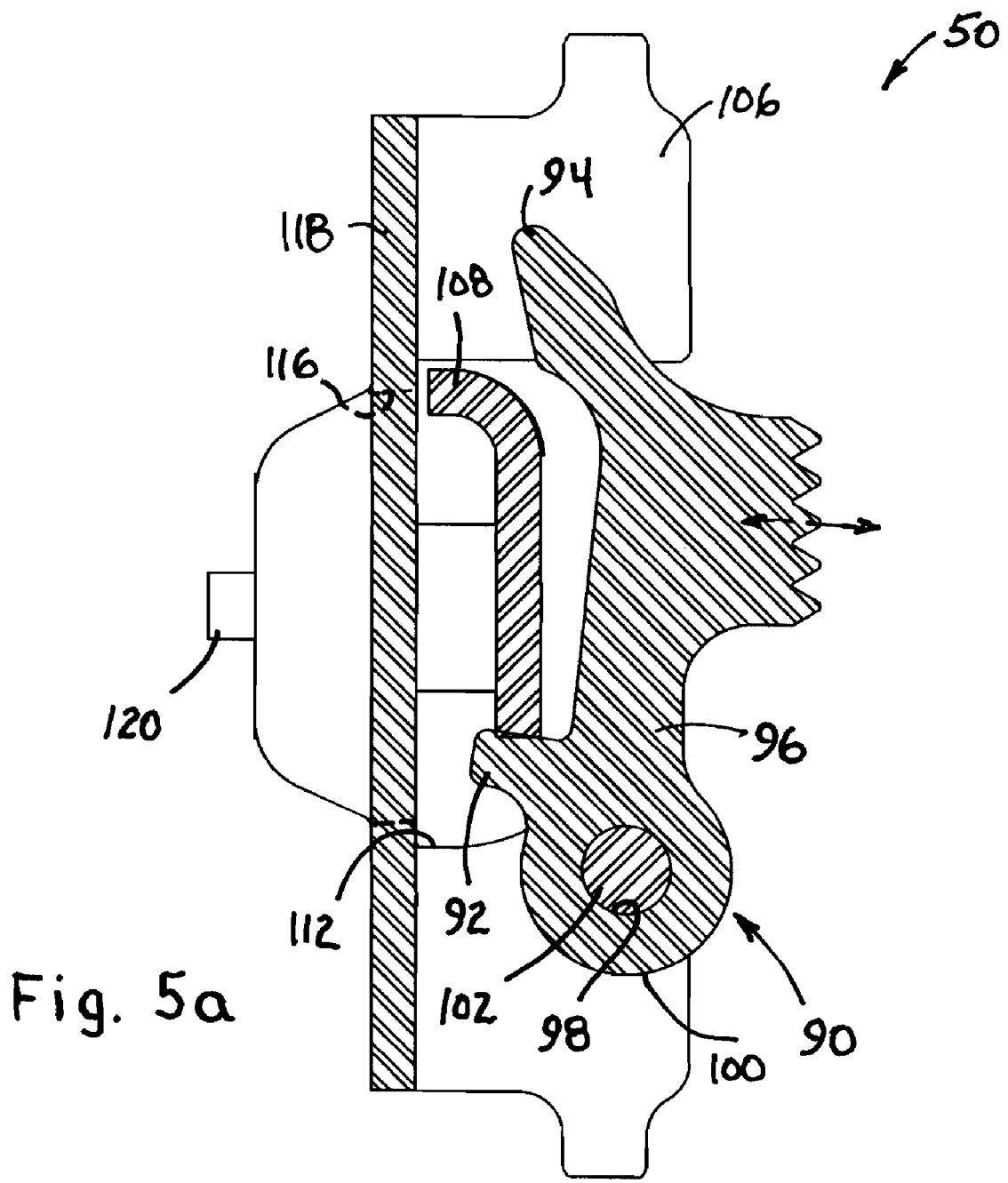
FIG. 5a is a section view of FIG. 5.
Figure 6:
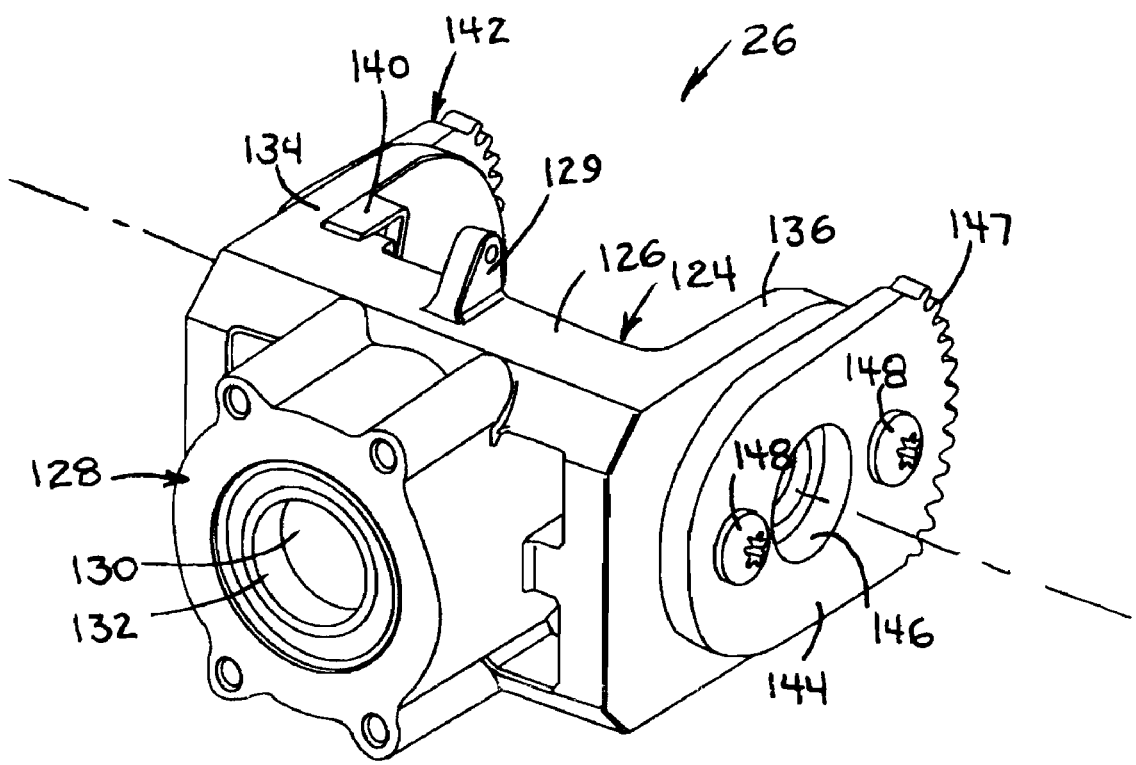
FIG. 6 is an oblique view of an upper housing assembly.

The telescopic position of the middle member assembly 24 described above in relation to FIG. 4 may be locked in position by a telescope lock assembly 50 shown in FIGS. 1, 5 and 5a. In one embodiment, the lock assembly 50 may be attached to a side of the lower housing member 28 by a bracket 86. Although it is contemplated that the bracket 86 may have a generally C-shaped profile formed from a stamped steel or aluminum plate, the bracket 86 may take on any desirable shape to achieve the stated purpose of engaging the tubular member 52 through a slot 88 formed in the respective side of the lower housing member 28 (See FIG. 2). As best illustrated in the cross section shown in FIG. 5a, the telescope lock assembly 50 includes a locking pawl 90 having two cam lobes 92 and 94 formed along an arm 96 having a pivot hole 98 at one end 100. The locking pawl 90 is mounted in pivotal engagement to the bracket 86 by a pin 102 extending between the two arms 104 and 106 of the bracket 86, and passing through pivot hole 98 in the end 100 of the arm 96. The lobes 92 and 94 of the locking pawl 90 are engaged by a locking plate 108 disposed in locking engagement in slots 110 and 112 formed in the arms 104 and 106 of the bracket 86, respectively. The locking plate 108 may be pivotally attached to the bracket 86 by a pin defining a pivot point 114. Another slot 116 may be punched through the web 118 to define a port through which a flange 120 of the locking plate 108 extends perpendicularly therefrom. The opposite end of the cable assembly 119 briefly mentioned above may be coupled to the flange 120 of the locking plate 108 to cause the locking plate to cycle between a first and a second position to engage the different cam lobes 92, 94 mentioned above. The flange 120 of the locking plate 108 may be held in position relative to the web 112 by a spring or other biasing mechanism in order to keep the locking pawl 90 engaged against tube member 52. The cable assembly 119 itself functions in a generally accepted manner. Both ends of the cable sheath are fixed relative to one another, and it is the cable within the sheath that performs the actuation. For example, one end of the cable sheath may be fixedly attached to the fixed yolk member 56 of the middle member while the second end of the sheath may be fixedly attached to a flange 121 extending from the telescope locking assembly bracket 86. One end of the cable passing through the sheath may be attached by a cable anchor to the lever 84 with the opposite end attached to the locking plate flange 120. As the lever 84 is moved between a first and a second position, tension is applied and released respectively on a cable assembly 119, causing the locking plate 108 to translate and engage the different cams 92 and 94 to release and lock the locking pawl 90 relative to the tubular member 52.

Pivotally attached to the yoke member 56 fixed at one end of the middle member assembly 24 is the upper member assembly 26 mentioned earlier. The upper member assembly 26 also includes a yoke member 124 having a central web 126 and a neck structure 128. At least one post member 129 extends upwardly and away from the central web 126 to provide the second and opposite coupling point for the biasing member or tension spring 71 mentioned above. The tension applied by the spring 71 always places a negative bias on the upper member assembly 26 to pull the steering column in the upright position once the locking mechanism described above is released.

Extending through the entire upper member assembly 26 concentrically through the neck structure 128 and the web 126 of the yoke member 124 is an axial bore 130 coincident with the longitudinal axis l. The axial bore 130 may include one or more concentric cylindrical recesses adapted to receive bearing members such as identified generally by numeral 132.

Extending from opposite ends of the web 126 on a side opposite to that having the neck structure 128 are arms 134 and 136 spaced such that they lie immediately outboard and adjacent to the flanges 62 and 64 extending from the web of the fixed yoke 56 described earlier. Bolts 138 are used to pass through arms 134 and 136 and thread into flanges 62 and 64 to provide a pivot axis about which the yoke member 124 may swing in an arc defined by a first or low position and a second or high position. The degree or range of the arc for the upper yoke member 124 is controlled by tilt stops 140 detachably anchored to the web 126 just inboard of the arms 134 and 136. The tilt stops 140 are designed to contact the shoulders 68 formed by the tapered edges of the flanges 62 and 64. The range of the angular arc can be adjusted by placing tilt stops 140 of different sizes on the yoke member 124.

Attached to the outboard side of each arm 134 and 136 may be left and right ratchet members 142 and 144. Each toothed rack 142 and 144 may be generally oval in shape formed from metal plate, and include a central opening 146 for providing access to the bolts 138. The toothed racks 144, 146 can be made from other rigid materials including polymers that can be machined or formed into the desired shape and to provide the series of teeth 147 along at least one edge. Also extending through each toothed rack 142, 144 may be two mounting slots (not shown) disposed on opposite sides of the central opening 146 for receiving mounting screws 148 to fix each toothed rack 142, 144 to the yoke member 124. The mounting slots are preferably oval to permit fine adjustment of the toothed racks to insure positive alignment and engagement with the teeth on the locking pawls 76 and 78. In essence the mounting slots permit the toothed racks 142, 144 to float in position until final adjustment. When fixed, the teeth on one end of each toothed rack 142, 144 become positively engaged with the corresponding mating teeth on each locking pawl 76, 78 as a result of the bias applied by the springs 82.

Figure 7:
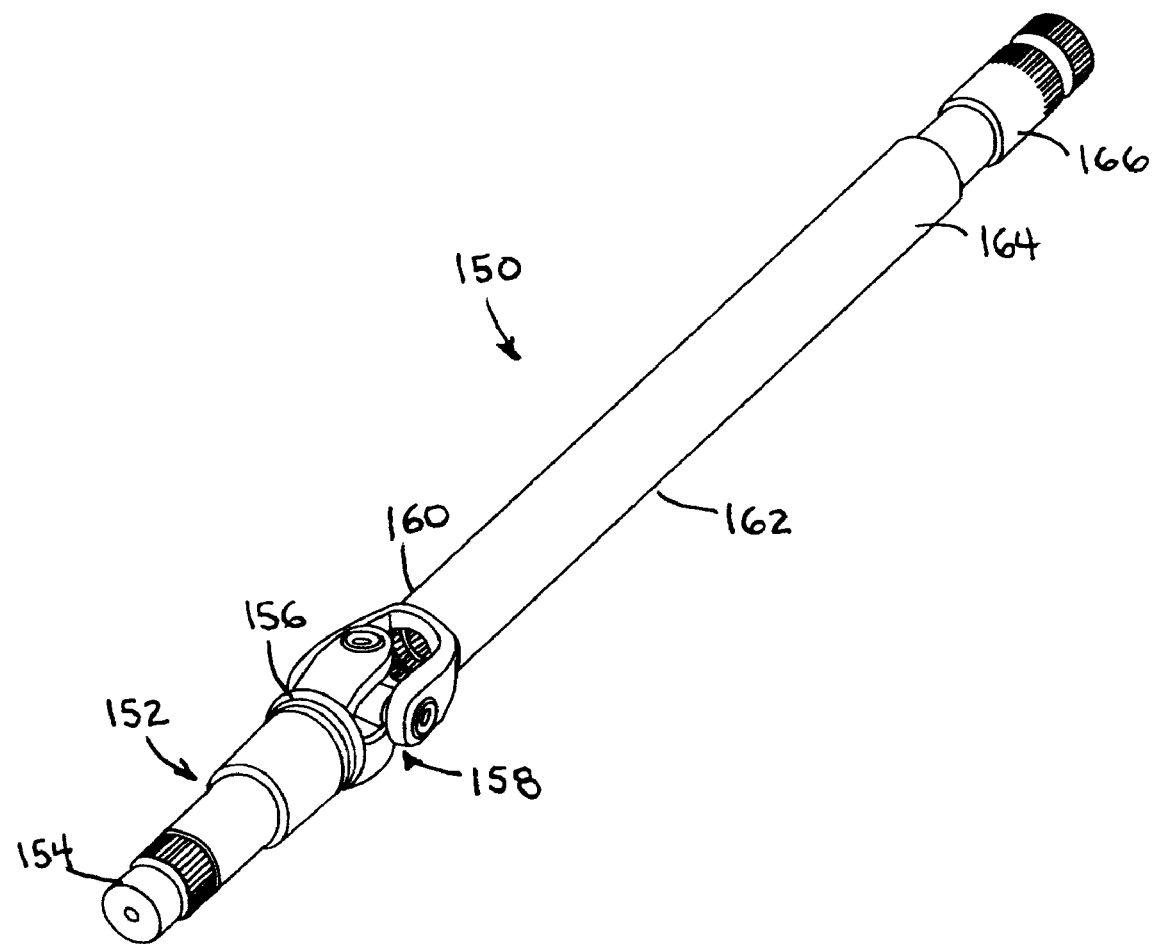
FIG. 7 is an oblique view of a shaft assembly contemplated to be used in conjunction with the invention.

Extending through each of the assemblies described above is a shaft assembly 150 for transferring the user's rotation of the steering wheel to the steering box of the vehicle. In a preferred embodiment, the shaft assembly 150 shown in FIG. 7 includes an upper shaft member 152 to be received through the bearings 132 of the yoke member 124 such that end 154 extends out through the proximate side and to be later fitted with a steering wheel. The opposite end 156 is firmly attached to one yoke of a universal joint 158 disposed in the gap between the yoke member 124 and the fixed yoke member 56. The universal joint 158 interconnects the upper shaft member 152 to the upper end 160 of the lower shaft member 162 passing through the axial bore 58 in the fixed yoke member 56 as well as the tubular members 52. Bearings not shown in the fixed yoke member and the tubular member respectively provide centering and support for the lower shaft member.

The lower shaft member 162 further includes a tubular portion 164 adapted to concentrically receive another portion of the shaft assembly 166 intended to interconnect with the remainder of the steering assembly intermediate the interior of the passenger compartment and the gear box (rack and pinion or other assembly) responsible for controlling the vehicle wheels. It is preferred that the lower shaft member 162 include a spring or other biasing mechanism for aiding in the telescoping of the lower shaft 164 relative to the shaft 166 when the column is extended. The bias also insures that the shaft assembly 166 remains in fixed rotational connection with the remainder of the lower steering control mechanism when in use. This overall construction of a telescoping and tilting inner shaft assembly is becoming more common and is often referred to as a "Matsui" style sliding shaft.

The operator may adjust the relative position of the steering column assembly represented by the middle member assembly and the upper member assembly 24, 26, respectively by moving the lever 84 to cause the locking pawls 76 and 78 to disengage the respective toothed racks 142, 144. Nearly simultaneously, actuation of the lever 84 causes the locking pawl 90 to disengage from the tubular member 52 in the lower housing member 28. As the locking mechanisms are released, the spring 71 interconnecting the yoke 56 with the upper member assembly 26 pulls the steering wheel upward to provide ample room for the operator to enter or leave the vehicle. The locking mechanisms are released by a cable used to interconnect the lever 84 to the locking plate 108 to make the locking pawl 90 engage and disengage with the tubular member 52. The sheath of the cable can be used to protect the enclosed cable, or alternatively, can be used to translate the force exerted by the lever 84. In one embodiment, the cable may remain stationary while the sheath traverses back-and-forth over the cable. One end of the sheath may be attached to the pawl bar 96. The opposite end of the cable sheath may engage the flange 120 of the telescopic lock assembly 50. As the flange 120 moves and releases pressure on the pawl, the pawl is forced away, permitting the column to slide.

With both the tilt and the telescope portions of the column assembly 20 disengaged, the operator may extend or retract the telescoping portion to the desired position while at the same time adjusting the tilt position of the upper member assembly. By releasing the lever, the various biasing mechanisms cause the respective locking members to reengage and fix the position of the different assemblies desired by the operator.

The reader is now referred to FIGS. 8 through 14 which depict a second embodiment of the steering column assembly 220. This alternate embodiment of the steering column assembly 220 includes a lower assembly 222, a middle assembly 224, and an upper assembly 226, all of which are controlled by a locking assembly generally identified by reference numeral 228. Each of these components interacts to provide the variety of adjustable positions demanded by the vehicle user. Moreover, the physical relationship and tolerances between the different assemblies also result in the improved performance of the invention.

In the alternate embodiment, the lower assembly 222 includes a lower housing 230 having a length (l) greater than its width (w) or its height (h) and may have the general or overall form of a rectangular solid similar to that described above. The lower housing 230 preferably includes a longitudinal bore or passage 232 extending the entire length from a first end 234 to the opposite end 236 to define an interior wall 238 and an exterior wall 240. For the purposes of this embodiment and general engineering principles, it is preferred that the longitudinal bore or passage 232 be disposed parallel to the longitudinal axis l of the lower housing 230. It is also contemplated that the exterior wall 240 of the lower housing 230 could be formed to provide various structures to mount the lower housing 230 to the vehicle. The reader is referred to the elements set forth in the first embodiment described above. The same types of materials may be used to produce the lower housing 230 as has been described.

Figure 10:
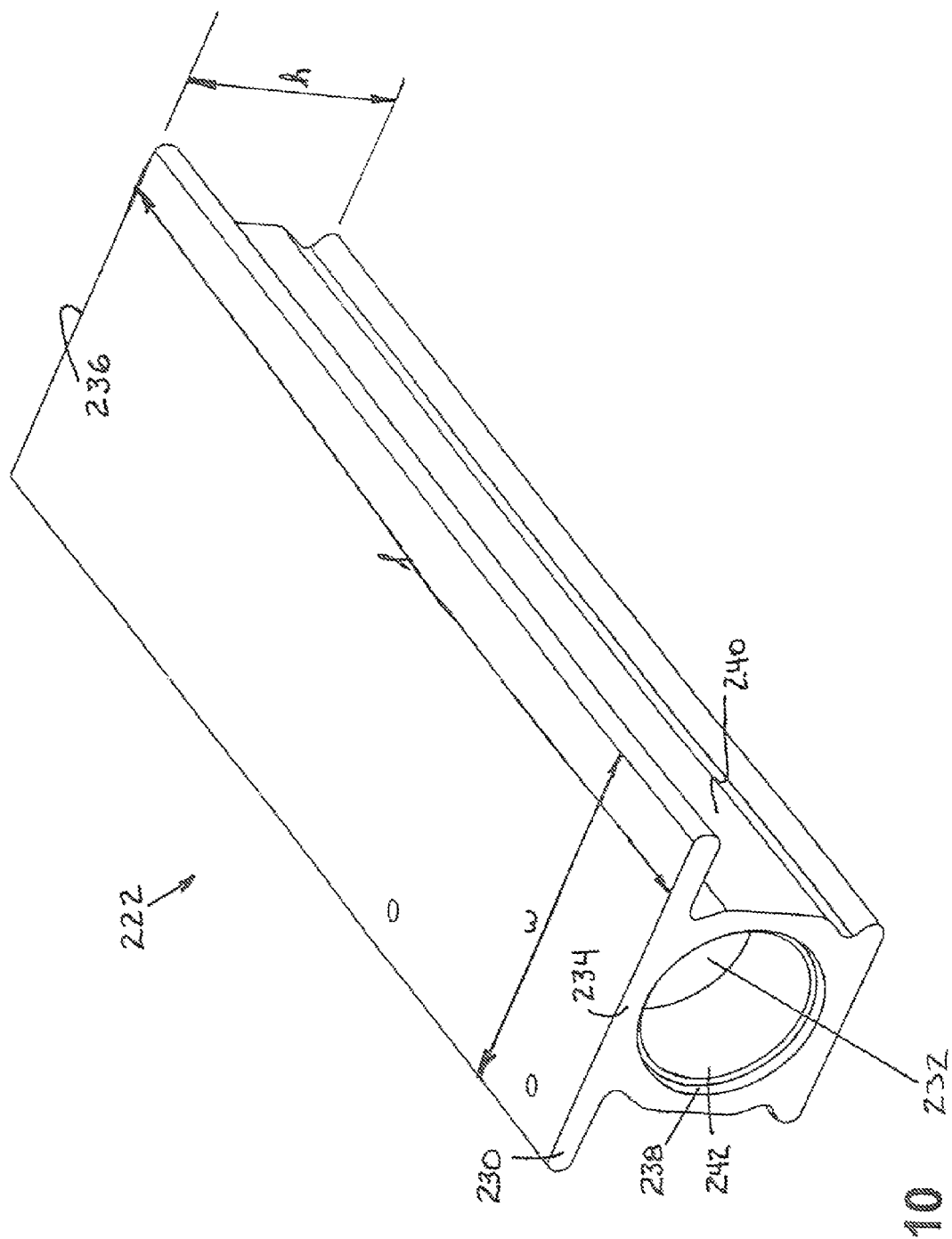
FIG. 10 is an oblique view of a fixed telescope housing assembly.

The second embodiment of the lower housing 230 shown in FIG. 10 is substantially similar to the embodiment just described. However, in the this embodiment, rather than using the pins to provide centering, lash is reduced through the use of one or more lash reduction bushings or rings 242. The lash reduction ring or bushing 242 is ideally made from a polymeric material including, but not limited to, polyurethane. A lash reduction ring is typically a cylindrical insert having an outer surface thereof abutting the interior wall 238 of the central bore 232. Although a polymeric material is preferred, more traditional materials such as bronze and other new "self-lubricating" materials may be used. The use of the lash reduction bushings or rings 242 removes the need for the pins 42 and 44 described earlier.

Figure 11:
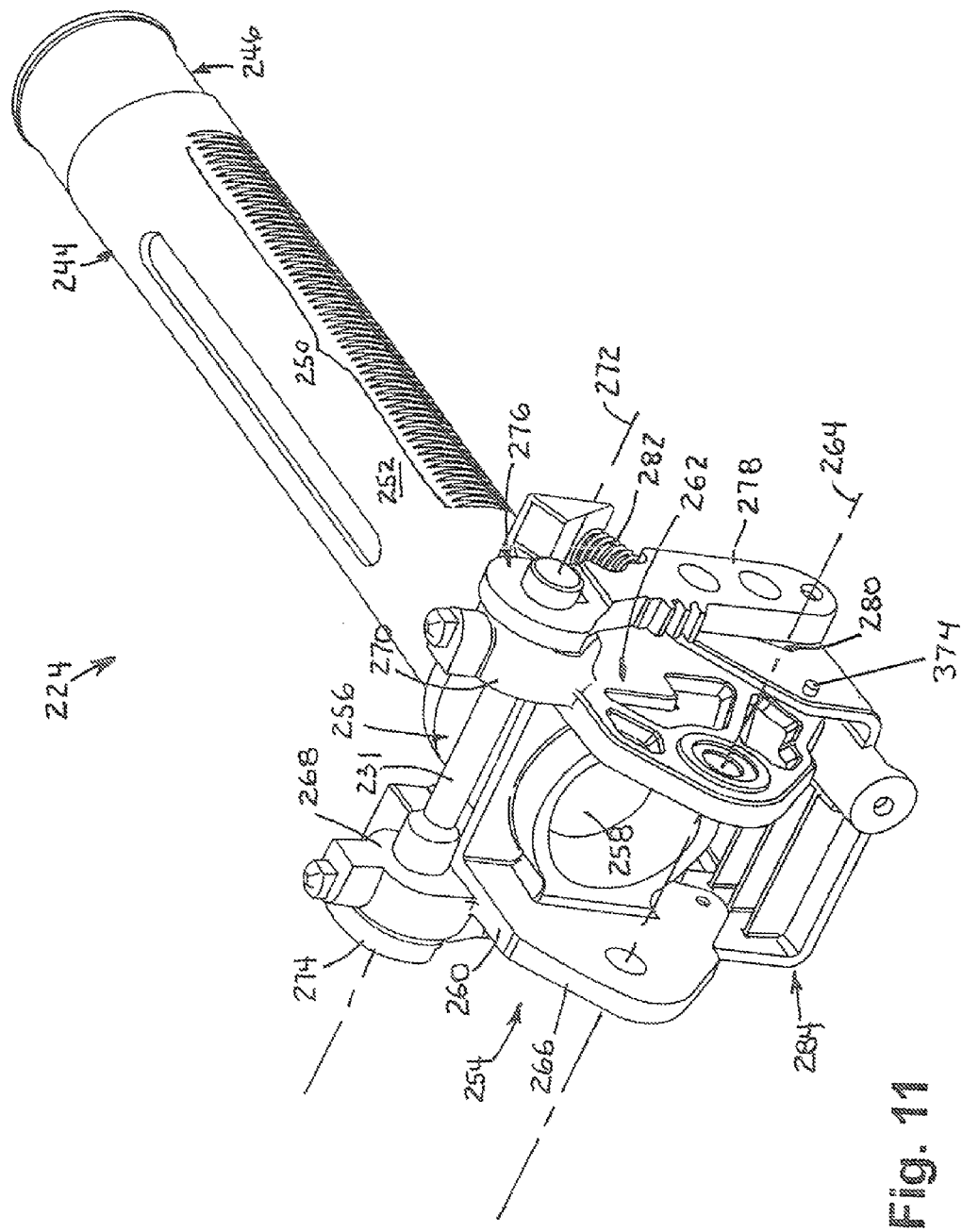
FIG. 11 is an oblique view of a middle assembly.

Referring to FIG. 11, a second embodiment of the middle assembly 224 is shown having an outer and inner tube member 244, 246. The inner tube member 246 remains within outer tube member 244 at a fixed position relative to housing 230. The outer tube member 244 is concentrically aligned with the inner tube member 246 and is slideably disposed over an upper end thereof. The outer tube 244 includes a slot 248 for interacting with a bolt or similar stop extending though the lower housing 230 to regulate the distance that the outer tube 244 can translate. Regularly spaced protrusions 250 or teeth are formed in the outer surface 252 of the outer tube 244 for purposes readily apparent below. These protrusions or teeth 250 interact with the telescopic lock assembly 228 to temporarily fix the position of the outer tube 244 relative to the inner tube 246.

Attached to one end of the outer tubular member 244 is one half of the tilting mechanism 254 for the steering column 220. The tilting mechanism 254 includes a first yoke-portion 256 that may be made from aluminum, steel, or any rigid material including polymers using conventional casting or machining techniques. Yoke portion 256 includes an axial bore 258 in line with the bore 232 of the tubular member 230 and the appropriate flanges necessary to permit tilting of the upper member assembly 226 described in greater detail below. In addition the yoke portion includes at least one post 231 or other attachment points for receiving the ends of one or more springs 233. The opposite ends of the springs 233 are coupled to the upper assembly as greater in greater detail below.

It is also contemplated that yoke 256 include two flanges 260 and 262, each disposed diametrically opposite the other and on opposite sides of the axial bore 258. In a preferred embodiment flanges 260 and 262 lie parallel to one another and in planes normal to the transverse axis 264 about which the upper assembly 226 pivots. In addition, the distal ends of each flange 260 and 262 spaced from the yoke 256 may form a tapered shoulder as indicated by numeral 266 to provide a stop to limit the pivot angle of the upper assembly 226.

Adjacent each of the flanges 260 and 262, and preferably disposed slightly outboard of each may be a lobe 268 and 270 adapted to provide a pivot point 272 for a respective locking pawl 274 and 276. In one form of the invention, the opposite ends of each locking pawl 274 and 276 may include a cam member 278. Alternatively, it is envisioned that a solid bar or other structure 280 interconnect the respective free ends of the pawl members 274 and 276. Springs 282 disposed between each locking pawl 274 and 276 and the fixed yoke 256 urge the locking pawls 274, 276 away from the fixed yoke 256 so that they positively engage the upper member assembly described in greater detail below. A lever 284 pivotally coupled to the bottom of the fixed yoke member 256 positively contacts the rod 280 interconnecting the locking pawl 274, 276 to urge each locking pawl to an open position, compressing the springs 282. Release of the lever 284 permits the rod 280 to return to its original bringing with it the ends of the locking pawls 274, 276 because of the bias applied by the springs 282.

Figure 8:
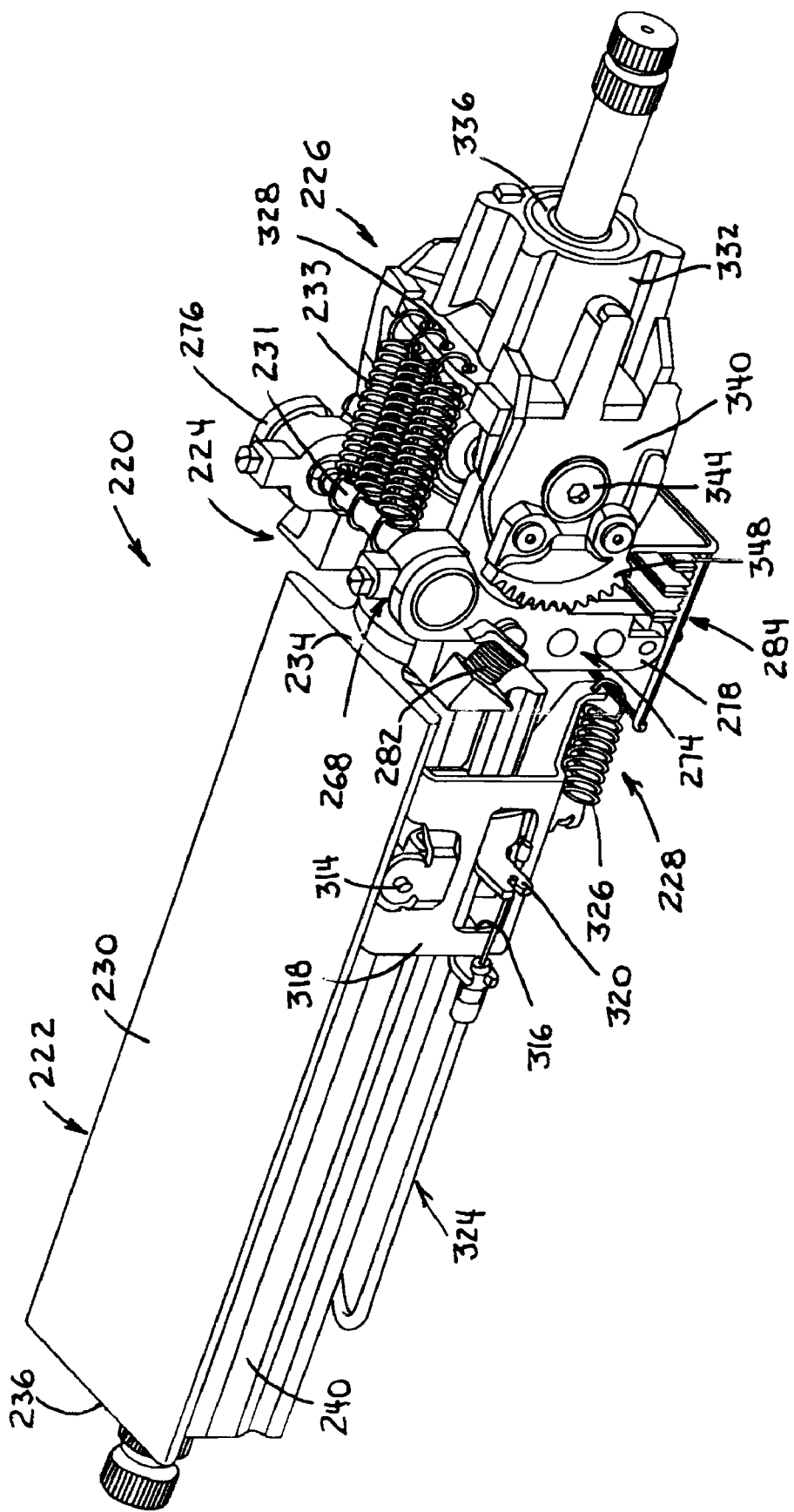
FIG. 8 is an oblique view of another embodiment of a column assembly comprising the invention.
Figure 9:
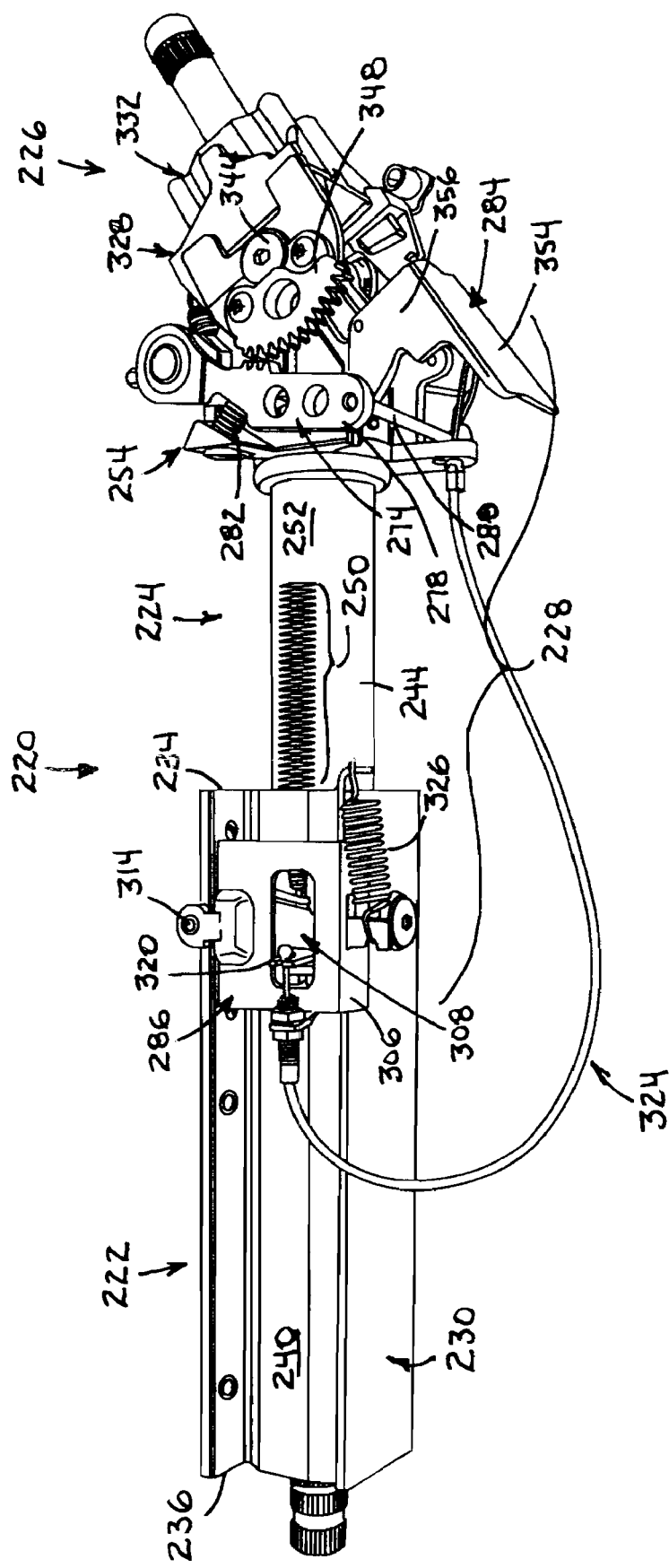
FIG. 9 is an oblique view of a column assembly in its unlocked state.
Figure 13:
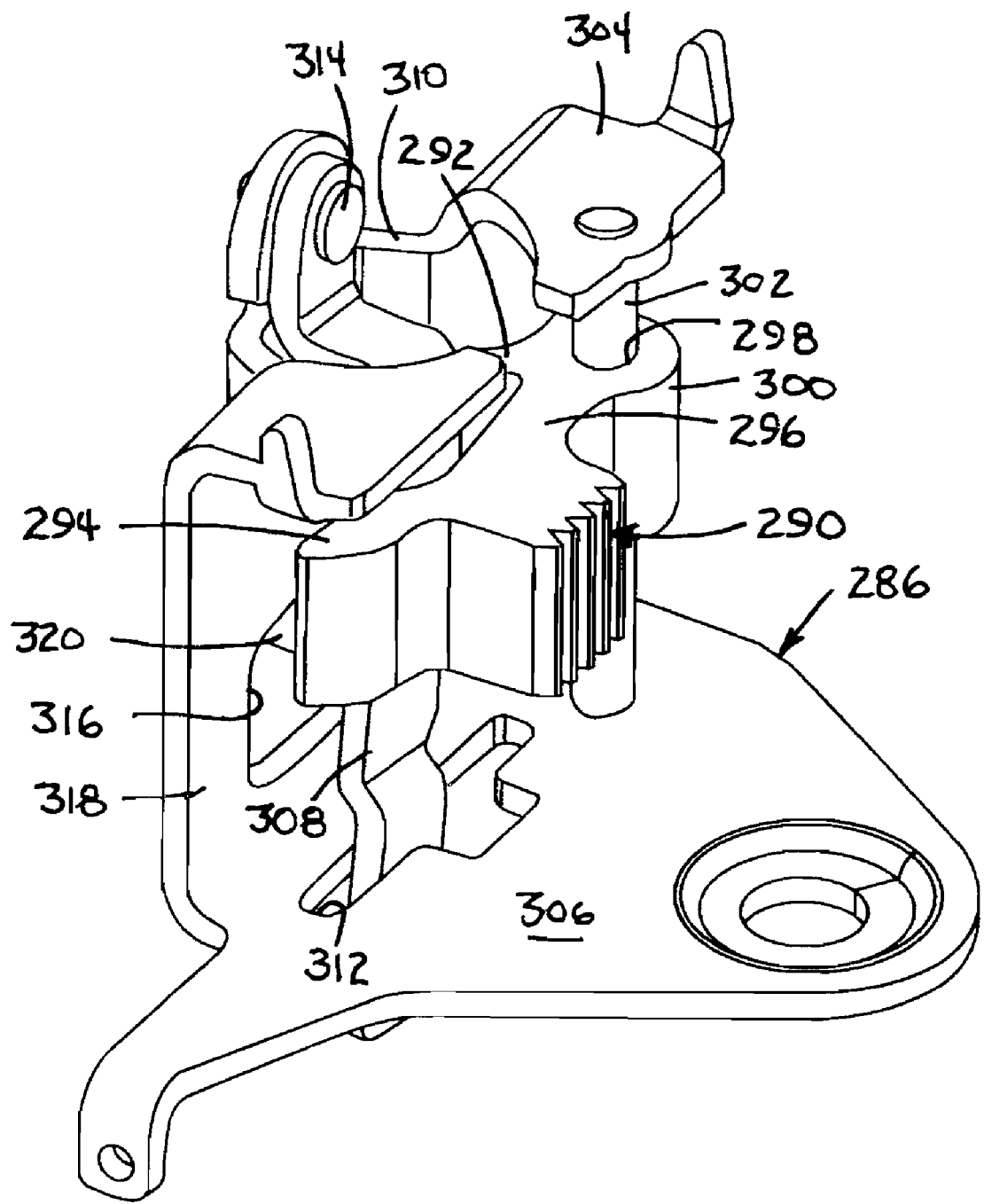
FIG. 13 is an oblique view of a telescope lock assembly.

The telescopic position of the middle assembly 224 briefly described above may be locked in position by the telescope locking assembly 228 shown in FIGS. 8 and 13. In one embodiment, the telescope locking assembly 228 may be attached to a side of the lower housing member 230 by a bracket 286. Although it is contemplated that bracket 286 may have a generally C-shaped profile formed from a stamped steel or aluminum plate, the bracket 286 may take on any other desirable shape to achieve the stated purpose of engaging the tubular member 244 of the middle assembly through a slot similar to Slot 88 shown in FIG. 2 and formed in the respective side of the lower housing 230. As best illustrated in FIG. 13, the lock assembly 228 includes a locking pawl 290 having two cam lobes 292 and 294 formed along an arm 296 having a pivot hole 298 at one end 300. The locking pawl 290 is mounted in pivot engagement to the bracket 286 by a pin 302 extending between the two arms 304 and 306 of the bracket 286, and passing through pivot hole 298 in the end 300 of the arm 304. The lobes 292 and 294 of the locking pawl 290 are engaged by a locking plate 308 disposed in locking engagement in slots 310 and 312 formed in the arms 304 and 306 of the bracket 286, respectively. The locking plate 308 may be pivotally attached to the bracket 286 by a pin defining a pivot point 314. Another slot 316 may be punched through the web 318 to define a port through which a flange 320 of the locking plate 308 extends. One end 322 of a cable assembly 324 may be attached to the flange 320 of the locking plate 308. The flange 320 of the locking plate 308 may be held in position relative to the web 318 by a spring or other biasing mechanism 326 in order to keep the locking pawl 290 engaged against tube member 244. As the lever 284 is moved between a first and a second position, tension is applied and released respectively on the cable assembly 324, causing the locking plate 308 to translate and engage the different cams 292 and 294 to release and lock the locking pawl 290 relative to the tubular member 244.

Figure 12:
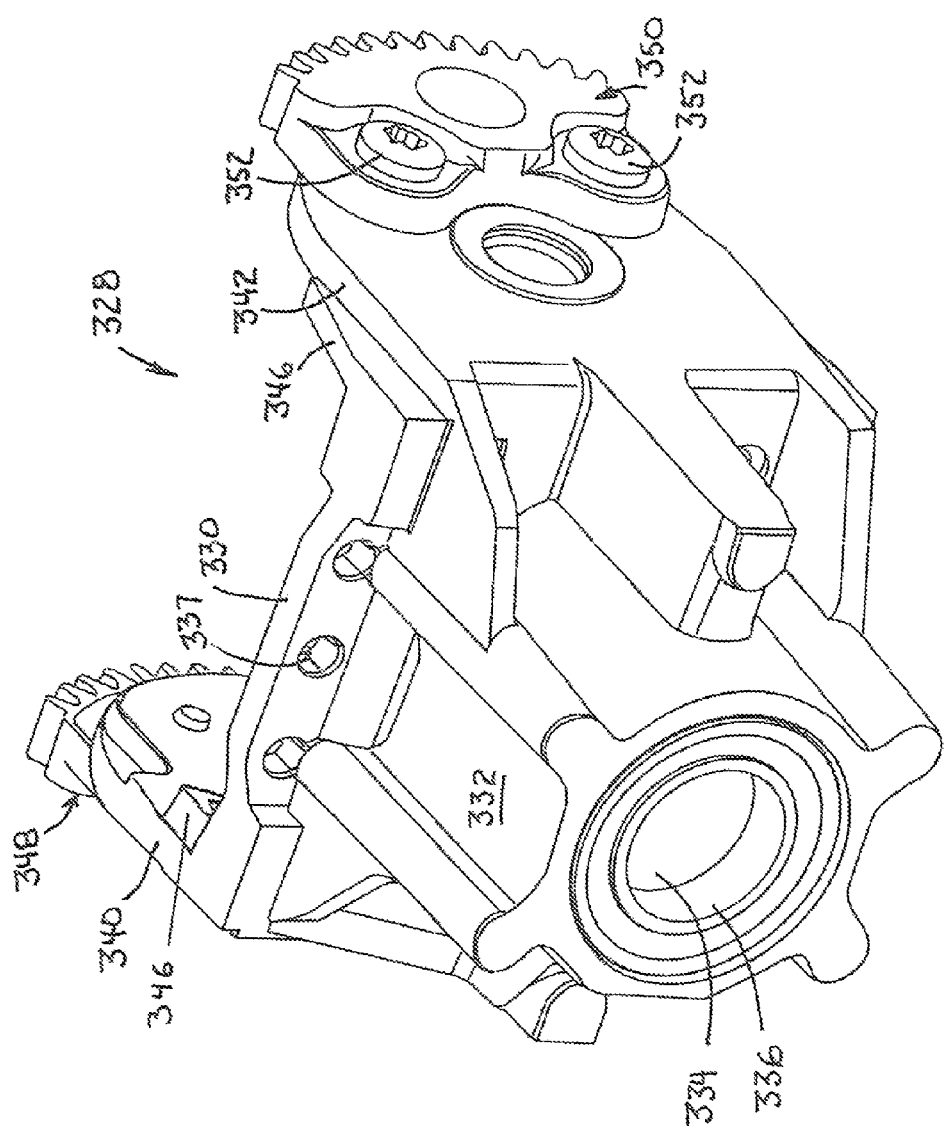
FIG. 12 is an oblique view of an upper housing assembly containing a schematic representation of part 346.

Attached to the middle member assembly 224 is the upper member assembly 226 shown in FIG. 12. The upper assembly 226 includes a yoke member 328 having a central web 330 and a concentrically located neck structure 332. Passing concentrically through the neck structure 332 and the web 330 of the yoke member 328 is an axial bore 334 coincident with the longitudinal axis 1. The axial bore 334 may include one or more concentric cylindrical recesses adapted to receive bearing members such as identified generally by numeral 336.

Just as in the previous embodiment, attachment points such as holes 337 are provided along the upper portion of the upper member 226 to receive the opposite ends of at least one of the springs used to interconnect the middle and upper assemblies 224 and 226, respectively. The tension applied by the springs always rotates the upper assembly in the most upright position when the locking system is released.

Extending from opposite ends of the web 330 on a side opposite to that having the neck structure 332 are arms 340 and 342 spaced such that they lie immediately outboard and adjacent to the flanges 260 and 262 extending from the web of the first yoke 256 described earlier. Bolts 344 may pass through arms 340 and 342 and thread into flanges 260 and 262 to provide a pivot axis about which the second yoke member 328 may pivot in an arc defined by a first or low position and a second or high position. The degree or range of the angular arc may be controlled by tilt stops 346 detachably anchored to the web 330 just inboard of the arms 340 and 342. The tilt stops 346 are designed to contact the shoulders 266 formed by the flanges 260 and 262. The range of the angular arc can be adjusted by placing tilt stops 346 of different sizes on the yoke member 328.

Attached to the outboard side of each arm 340 and 342 are a left and a right rack member 348 and 350. Each rack member 348 and 350 can be made from an assortment of rigid materials including polymers that can be machined or formed into the desired shape. Each rack member 348, 350 may be fixed in place by mounting screws 352. The mounting holes for each rack 348, 350 are preferably oval to permit fine adjustment of the racks 348, 350 for proper alignment with the teeth on the locking pawls 274 and 276. When fixed, the teeth on one end of each rack 348, 350 become positively engaged with the corresponding mating teeth on each locking pawl 274, 276 as a result of the bias applied by the springs 282.

Extending through each of the assemblies is a shaft assembly substantially identical to the shaft assembly 150 described above. Details of that structure can be found by referring to the description set out above with particular reference to FIG. 7.

Figure 14:
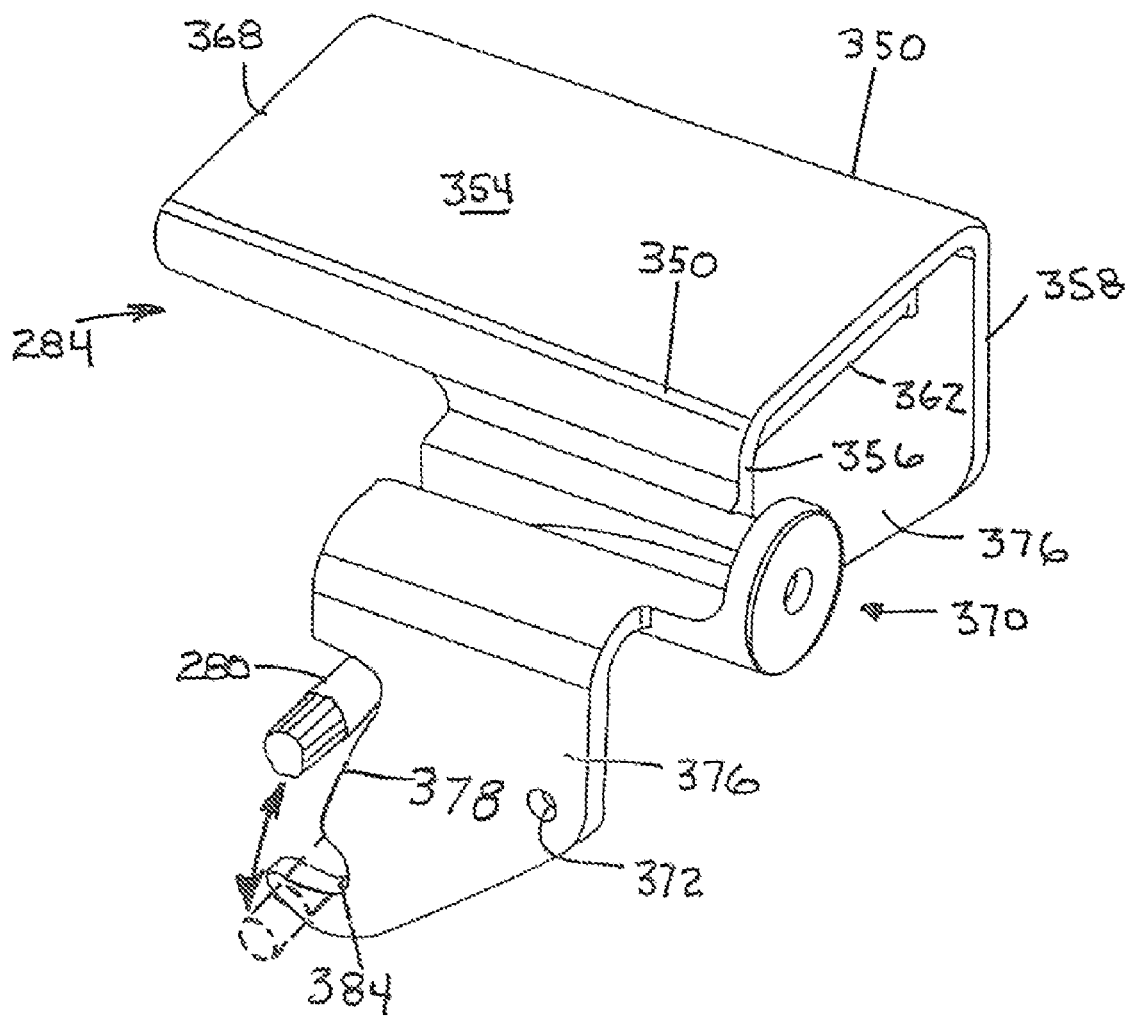
FIG. 14 is an oblique view of one embodiment of the lock actuator.

FIG. 14 illustrates an alternate embodiment of the lock actuating lever 284. Parallel flanges 356, 358 are spaced apart and attached along a lower edge 350 by a cross member 362. An actuating edge 378 of each flange 376 include a first and second over-center well or recess 366 that receives the pawl bar 280. The cross member 362 is substantially rectangular with one end comprising a lip 368. A lower corner 370 of each flange 356, 358 opposing the cam edge 378, includes an attachment hole 372 for mounting the lever 284 to the fixed yoke-portion 256 on the middle assembly. The lever 284 is pivotally coupled to the middle assembly by a pin 374 that extends through the lever as shown in FIG. 11. The lip 368 extends away from the pivot point and may include ridges that provide enhanced tactile and gripping characteristics for the operator. The cross member 362 includes substantially rectangular transverse uprights 376 connecting the inner surface of the cross member 362, and the inner surfaces of the flanges 356, 358. The cross member 362 provides lateral structural support between the flanges 356, 358 and is particularly useful for a lever composed of a polymeric material.

The over-center recesses or wells 366 on the flanges 356, 358 act as stops and interact with the pawl rod 280 to hold the lever 284 in a temporarily fixed position allowing the user to adjust the tilt and telescopic position of the steering column without the need to maintain a hold on the lever. The flange includes a cam edge 378 over which the pawl rod travels when the lever is moved. The pivoting motion of the lever 284 causes the pawl rod 280 to translate because of the curvature of the cam edge 378.

One of the flanges such as 356 may additionally contain a channel 380 for aligning a cable. A circular surface 382 closes off one end of the channel 380 and includes a small hole 384 through which the cable passes. The cable can be anchored against the circular surface 382 opposite the channel 380 with an anchor attachment larger than the size of the cable hole 384.

A second embodiment of the telescopic lock assembly as depicted in FIG. 13, introduces minor differences from the embodiment disclosed above. The telescopic position of the middle member assembly 224 may be locked in position by a telescope lock assembly 228 shown in FIGS. 8, 9, and 13. In this embodiment, the lock assembly 228 may be attached to one side of the lower housing member 230 by a bracket 318. Although it is contemplated that the bracket 318 may have a generally C-shaped profile formed from a stamped steel plate, the bracket 318 may take on any other desirable shape to achieve the stated purpose of engaging the tubular member 244 through a slot (not shown) formed in the respective side of the lower housing member 230 (See a similar structure in FIG. 2). The lock assembly 228 includes a locking pawl 290 having two cam lobes 292 and 294 formed along an arm 296 having a pivot hole 298 at one end 300. The locking pawl 290 is mounted in pivot engagement to the bracket 318 by a pin 302 extending between the two arms 304, 306 of the bracket 318, and passing through pivot hole 298 in the end 300 of the arm 296. The lobes 292, 294 of the locking pawl 290 are engaged by a locking plate 308 disposed in rocking engagement in slot 316 formed in the web of the bracket 318. The locking plate 308 is pivotally attached to the bracket 318 at a pivot point 314. Another slot 312 punched through the web 318 provides a port through which a flange 320 of the locking plate 308 extends. One end of a cable assembly 324 is anchored to the flange 320 of the locking plate 308 while the opposite end of the cable assembly 324 is attached to the lever 284 described above. The locking plate 308 is interconnected to the bracket 318 by a spring 228 or other bias mechanism to bring the locking plate 308 back to a predetermined position once the tension is released. As the lever 284 is moved between a first and a second position, tension is applied and released respectively on the cable assembly 324, causing the locking plate 308 to translate and engage the different cams 292, 294 to release and lock the locking pawl 290 relative to the outer tubular member 244. In this embodiment, the bracket 318 is attached to the lower housing member 230 with a bolt or other suitable fastener. The bolt may pass through a mounting hole on lower arm of the bracket 318 and acts to not only mount the bracket to the lower housing member 230, but also to act as a stop to the outer tube member 244 as it translates between a first and second position in a direction parallel to its longitudinal axis.

In the second embodiment of the invention 220, the cable assembly 324 functions in a generally accepted manner. Both ends of the cable sheath are fixed relative to one another, and it is the cable within the sheath that performs the actuation. For example, one end of the cable sheath may be fixedly attached to the first yolk portion 256 of the middle member while the second end of the sheath may be fixedly attached to a flange extending from the telescope locking assembly bracket. One end of the cable passing through the sheath may be attached by a cable anchor to the lever with the opposite end attached to the locking plate flange. In operation, moving the lock actuating lever 284 from the locked position to the unlocked position causes the cable to be pulled through the sheath thereby moving the locking plate 308 which is biased against such movement by the spring 228 attached to the lower arm of the bracket. With the locking plate 308 disposed between the two cams 292, 294 of the locking pawl 290, the movement of the locking plate transitions the actuating pressure from one of the pawl cams to the other thereby permitting the pawl from disengaging outer tube 244 of the middle member. The lever 284 includes two pawl rod stops. In the locked position, the pawl rod 280 of the tilt assembly rests securely in the recess that forms the first pawl rod stop. As the lever is pivoted downwardly the pawl rod 280 traverses the cam edge 378 and arrives at the second pawl rod stop where it can rest in the second recess 366. The pawl spring or bias 282 cause the paw rod 280 to press against the second recess thereby holding the lever 284 in an unlocked state. This secure hold of the pawl rod in the unlocked position allows the operator to adjust the tilt and telescopic positions of the steering column using both hands.

The operator may adjust the relative position of the steering column assembly represented by moving the lever 284 to cause the locking pawls 274, 276 to disengage the respective rack members 348, 350. Nearly simultaneously, actuation of the lever 354 causes the locking pawl 390 to disengage from the outer tubular member 284 in the lower housing member 230. The cable interconnecting the lever 284 to the locking plate 308 allows the locking pawl 290 to engage and disengage with the outer tubular member 244. In this embodiment, the sheath of the cable is fixed and it is the enclosed cable itself that is used to translate the force exerted by the lever. One end of the cable may be attached to the pawl bar 280 while the opposite end may be attached to the locking plate flange 320 of the telescopic lock assembly 228. As the locking plate flange 320 moves and releases pressure on the pawl, the pawl is forced away, permitting the column to slide. By pulling down on the lever until the over-center recesses are engaged, the user is permitted to use both hands to telescope and position the steering well. Once in place, the use need only exert a small amount of force to overcome the over-center latch, and lock the column and steering wheel in position.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A steering column assembly comprising:
 a lower assembly having a longitudinally disposed central bore;
 at least one lash reduction member disposed within said central bore;
 a middle assembly having at least one tubular member having an exterior surface containing a plurality of longitudinally arranged teeth; and
 a first yoke assembly attached to one end of said at least one tubular member for providing a pivotal coupling with said upper assembly and having an axial passage extending there through concentric with said central bore;
 a first portion of a tilt lock assembly biased to an extended position, where said at least one tubular member is slideably received within said central bore, and where an exterior surface of said at least one tubular contacts said at least one lash reduction member;

an upper assembly pivotally coupled to one end of said middle assembly and selectively fixed in position relative to said middle assembly by a tilt assembly; and a lock assembly attached to said tilt assembly and to said middle assembly for permitting simultaneously adjustment said tilt assembly as well as a telescopic position of said steering column.

2. The steering column assembly as defined in claim 1, wherein said at least one lash reduction member comprises one of at least one longitudinal biasing member and a bushing member extending into said central bore and contacting said middle assembly.

3. The steering column assembly as defined in claim 1, wherein said upper assembly comprises:

a second yoke assembly configured to pivotally couple with said first yoke assembly;

a second portion of a tilt lock assembly adapted to be engaged by said first portion of said tilt lock assembly; and at least one biasing member interconnecting said first yoke assembly with said second yoke assembly to urge said second yoke assembly to a predetermined position.

4. The steering column assembly as defined in claim 1, wherein said lock assembly comprises:

a first locking mechanism attached to said middle assembly for locking a tilt position of said upper assembly in position relative to said middle assembly;

a second locking mechanism attached to said lower assembly and selectively engaging said middle assembly for locking said middle assembly relative to said lower assembly between an extended position and a retracted position; and a linkage assembly interconnecting said first locking mechanism with said second locking mechanism so that both said first and said second locking mechanisms may be operated simultaneously.

5. The steering column assembly as defined in claim 1, wherein said lash reduction member comprises at least one rod having a longitudinal axis oriented in parallel to a longitudinal axis of said central bore and at least one bearing member and abutting said at least one tubular member.

6. The steering column assembly of claim 1, wherein said lash reduction member comprises a cylindrical polymeric element having an outer surface and an inner void, said outer surface abutting said central bore and said inner void supporting said at least one tubular member.

7. The steering column assembly of claim 1, wherein said at least one tubular member comprises an inner tube concentrically disposed within said central bore, and an outer tube slideably and concentrically received over said inner tube for translating thereon between a first retracted position and a second extended position.

8. The steering column assembly of claim 1, wherein said tilt assembly comprises:

a tilting member hingedly attached to a fixed member, said tilting member comprising a first and a second interconnected cam members, said cam members having a plurality of locking protrusions defined thereon.

9. The steering column assembly of claim 1, wherein said tilt assembly comprises at least one locking pawl hingedly attached to a fixed member, said locking pawl selectively adjustable between a locked and unlocked position, said locking pawl meshed with a set of locking protrusions in said locked position.

10. The steering column assembly of claim 1, wherein:

said at least one tubular member having a plurality of locking protrusions attached thereto; and said lock assembly further comprising a locking pawl operably attached to a lock actuator via a cable and selectively meshed with said plurality of locking protrusions.

11. The steering column assembly of claim 1, wherein:

said lock assembly further comprising a base and two parallel cam lobes extending out transversely therefrom forming a yoke, said yoke comprising a gripping end opposing a pivotal attachment point, each cam lobe of said cam lobes having a cam edge disposed between a first and second pawl stop.

12. The steering column assembly of claim 1, wherein said middle assembly comprising an elongated housing having a plurality of flanges disposed thereon.

13. The steering column assembly of claim 1, wherein said one or more tubular members having a plurality of locking protrusions attached thereto; and said lock assembly further comprising a bracket fixedly attached to said middle assembly, a locking plate operatively attached to said bracket, a locking pawl operably attached to said bracket, and a cable, said cable fixedly attached between a lock actuator and said locking plate, said locking plate selectively adjustable between a locked an unlocked position, said locking plate engaging said locking pawl with said locking protrusions in said locked position.

14. A steering column assembly comprising:

an elongated mounting element having a longitudinally extending center channel, a telescopic assembly comprising an elongated telescopic member disposed about a longitudinal axis, a lower portion thereof slideably disposed within said center channel of said mounting element;

a tilt assembly comprising a tilting member hingedly attached to a fixed member fixedly attached to an upper end of said telescopic member, said tilting member comprising two parallel lobes connected by a perpendicular cross-member, said parallel lobes having a plurality of locking protrusions attached thereto;

a tilt lock assembly operably attached to said tilt assembly comprising at least one locking pawl hingedly attached to said fixed member, said locking pawl selectively adjustable between a locked and unlocked position, said locking pawl meshed with said locking protrusions in said locked position;

a telescopic lock assembly operably attached to said mounting element;

an actuating handle pivotally attached to said tilt assembly, said handle selectively adjustable between a locked and unlocked position, said handle operably abutting said tilt lock assembly; and, a cable attached between said handle and said telescopic lock assembly.

15. The steering column assembly of claim 14, further comprising:

one or more positioning rods comprising a first portion parallel to said longitudinal axis abutting said telescopic member, a second portion angled away from said longitudinal axis, said second portion attached to said mounting element.

16. The steering column assembly of claim 14, wherein:

said telescopic member having a plurality of locking protrusions attached thereto; and said telescopic lock assembly further comprising a locking pawl, said locking pawl selectively meshed with said plurality of locking protrusions through actuation by said cable.

17. The steering column assembly of claim 14, wherein:
said lock actuator lever assembly comprising a handle pivotally mounted to said tilt assembly and in positive contact with a locking pawl of said tilt lock assembly.

18. The steering column assembly of claim 14, wherein:
said mounting element comprising an elongated housing having a plurality of flanges disposed thereon.

19. The steering column assembly of claim 14, wherein:
said telescopic member having a plurality of locking protrusions attached thereto; and
said telescopic lock assembly further comprising a bracket fixedly attached to said mounting element, a locking plate operatively attached to said bracket, a locking pawl operably attached to said bracket, and a cable enclosed by a sheath, said cable fixedly attached between a lock actuator and said locking plate, said sheath fixedly attached to said bracket, said locking plate selectively adjustable between a locked an unlocked position, said locking plate engaging said locking pawl with said locking protrusions in said locked position.

20. A steering column assembly comprising:
a telescopic assembly comprising one or more tube members comprising an inner tube, a lower end thereof fixedly attached to a middle assembly and an outer tube, wider in diameter than said inner tube, slideably disposed over an upper end of said inner tube;
a tilt assembly fixedly attached to an upper end of said telescopic assembly;
a tilt lock assembly operably attached to said tilt assembly;
a telescopic lock assembly operably attached to said telescopic assembly;
a lock actuating lever assembly comprising a base and two parallel lobes extending out transversely therefrom, said base comprising a gripping end opposing a pivotal attachment point, said first and second stop comprising a bight spaced apart along a cam edge of each lobe of said lobes; and where said lock actuator lever assembly is hingedly attached to said tilt assembly, said lock actuator lever assembly is operably attached to said tilt lock assembly, said lock actuator lever assembly is operably attached to said telescopic lock assembly, said lock actuator lever assembly is selectively adjustable between a locked and unlocked position, said lock actuator lever assembly further having a first and second pawl rod stop, and where said tilt lock assembly is fixedly engaging said first pawl rod stop in said locked position and said second pawl rod stop fixedly engaging said tilt lock assembly in said unlocked position.

21. The steering column assembly of claim 20, further comprising:
one or more mounting inserts attached within a longitudinally extending central bore of said lower assembly and abutting an outer surface of said one or more tube members; and,
a plurality of flanges disposed along an outer housing of said middle assembly.

22. The steering column assembly of claim 20, wherein:
said one or more tube members having a plurality of locking protrusions attached thereto; and,
said telescopic lock assembly further comprising a locking pawl operably attached to said lock actuator via a cable and selectively meshed with said plurality of locking protrusions.

23. A steering column assembly comprising:
a lower assembly having a longitudinally disposed central bore;
at least one lash reduction member disposed within said central bore;
a middle assembly having at least one tubular member slideably received within said central bore, where an exterior surface of said at least one tubular member in contact with said at least one lash reduction member;
an upper assembly pivotally coupled to one end of said middle assembly and selectively fixed in position relative to said middle assembly by a tilt assembly;
said tilt assembly comprising a tilting member hingedly attached to a fixed member, said tilting member comprising a first and a second interconnected cam members, said cam members having a plurality of locking protrusions defined thereon; and
a lock assembly attached to said tilt assembly and to said middle assembly for permitting simultaneously adjustment of a tilt angle of the steering column as well as a telescopic position of the steering column.

24. A steering column assembly having a high natural frequency for use in a vehicle, comprising:
a lower assembly having a longitudinally disposed central bore;
at least one lash reduction member disposed within said central bore;
a middle assembly having at least one tubular member slideably received within said central bore, where an exterior surface of said at least one tubular member in contact with said at least one lash reduction member;
an upper assembly pivotally coupled to one end of said middle assembly and selectively fixed in position relative to said middle assembly by a tilt assembly;
a lock assembly comprising a base and two parallel cam lobes extending out transversely therefrom forming a yoke, said yoke comprising a gripping end opposing a pivotal attachment point, each cam lobe of said cam lobes having a cam edge disposed between a first and second pawl stop; wherein
said lock assembly is attached to said tilt assembly and to said middle assembly for permitting simultaneously adjustment of a tilt angle of the steering column as well as a telescopic position of the steering column.

25. A steering column assembly having a high natural frequency for use in a vehicle, comprising:
a lower assembly having a longitudinally disposed central bore;
at least one lash reduction member disposed within said central bore;
a middle assembly having at least one tubular member having a plurality of locking protrusions attached thereto, slideably received within said central bore, where an exterior surface of said at least one tubular member in contact with said at least one lash reduction member;
an upper assembly pivotally coupled to one end of said middle assembly and selectively fixed in position relative to said middle assembly by a tilt assembly;
a lock assembly comprising a bracket fixedly attached to said middle assembly, a locking plate operatively attached to said bracket, a locking pawl operably attached to said bracket, and a cable, said cable fixedly attached between a lock actuator and said locking plate, said locking plate selectively adjustable between a locked an unlocked position, said locking plate engaging said locking pawl with said locking protrusions in said locked position; wherein
said lock assembly is attached to said tilt assembly and to said middle assembly for permitting simultaneously adjustment of a tilt angle of the steering column as well as a telescopic position of the steering column.

26. A steering column assembly comprising:

an elongated mounting element having a longitudinally extending center channel, a telescopic assembly having a plurality of locking protrusions attached thereto further comprising an elongated telescopic member disposed about a longitudinal axis, a lower portion thereof slideably disposed within said center channel of said mounting element;

a tilt assembly fixedly attached to an upper end of said telescopic member;

a tilt lock assembly operably attached to said tilt assembly;

a telescopic lock assembly comprising a bracket fixedly attached to said elongated mounting element, a locking plate operatively attached to said bracket, a locking pawl operably attached to said bracket, and a cable enclosed by a sheath, said cable fixedly attached between a lock actuator and said locking plate, said sheath fixedly attached to said bracket, said locking plate selectively adjustable between a locked an unlocked position, said locking plate engaging said locking pawl with said locking protrusions in said locked position operably attached to said mounting element;

an actuating handle pivotally attached to said tilt assembly, said handle selectively adjustable between a locked and unlocked position, said handle operably abutting said tilt lock assembly; and, a cable attached between said handle and said telescopic lock assembly.

* * * * *